US012418132B2

(12) United States Patent
Benitez et al.

(10) Patent No.: US 12,418,132 B2
(45) Date of Patent: Sep. 16, 2025

(54) ELECTRICAL POWER OUTLET HAVING FLEXIBLE COVER

(71) Applicant: Ford Global Technologies, LLC, Dearborn, MI (US)

(72) Inventors: Fabiola Benitez, Atizapan de Zaragoza (MX); Ailen Flores, Zinacantepec (MX); Silvia Lopez Portela, Mexico City (MX); Maria Alejandra Cobos, Mexico City (MX); Eduardo Arturo Aguilar Ruelas, Mexico City (MX)

(73) Assignee: Ford Global Technologies, LLC, Dearborn, MI (US)

(*) Notice: Subject to any disclaimer, the term of this patent is extended or adjusted under 35 U.S.C. 154(b) by 466 days.

(21) Appl. No.: 18/111,622

(22) Filed: Feb. 20, 2023

(65) Prior Publication Data

US 2024/0283188 A1 Aug. 22, 2024

(51) Int. Cl.
*H01R 13/447* (2006.01)
*H01R 105/00* (2006.01)

(52) U.S. Cl.
CPC ....... *H01R 13/447* (2013.01); *H01R 2105/00* (2013.01); *H01R 2201/26* (2013.01)

(58) Field of Classification Search
None
See application file for complete search history.

(56) References Cited

U.S. PATENT DOCUMENTS 3,317,881 A * 5/1967 Setecka ................ H01R 13/447 174/67
4,600,258 A 7/1986 Hu
6,222,125 B1 * 4/2001 Shoemaker ........ H01R 13/4534 174/67
7,399,921 B2 7/2008 McBain
9,543,685 B2 1/2017 Mortun et al.
10,505,326 B2 12/2019 Chien
10,840,657 B1 11/2020 Aguilar Ruelas et al.

FOREIGN PATENT DOCUMENTS

CN 201466297 U 5/2010
CN 202930611 U 5/2013
CN 105977699 A * 9/2016 ........... H01R 13/521
CN 208352627 U 1/2019
CN 111342291 A * 6/2020 ......... H01R 13/5213
KR 20080072731 A 8/2008

OTHER PUBLICATIONS

"10A 2500W Power Strip WIFI Smart LED Light Socket Plug Outlet Voice Control Work with Alexa Google Home," www.aliexpress.us, 10 pages, Accessed Dec. 22, 2022.

* cited by examiner

*Primary Examiner* — Tho D Ta
(74) *Attorney, Agent, or Firm* — Vichit Chea; Price Heneveld LLP

(57) ABSTRACT

An electrical power outlet includes a housing, a faceplate having a plurality of slots configured to receive a plurality of prongs on an electrical plug, a plurality of electrical terminals configured to receive the plurality of prongs to provide electrical connections and a flexible cover disposed between the plurality of slots and the plurality of terminals. The flexible cover having a plurality of slits configured to receive the plurality of prongs in an open position and for covering access to the plurality of terminals in a closed position.

15 Claims, 11 Drawing Sheets

ELECTRICAL POWER OUTLET HAVING FLEXIBLE COVER

FIELD OF THE DISCLOSURE

The present disclosure generally relates to electrical power outlets, and more particularly relates to an electrical power outlet having a tamper resistant layer, particularly for use in a vehicle, for example.

BACKGROUND OF THE DISCLOSURE

Motor vehicles are increasingly equipped with electrical power outlets for powering and charging electronic devices. Both direct current (DC) and alternating current (AC) power outlets can be found on motor vehicles. DC power from the vehicle battery may be converted with an inverter to AC power. It may be desirable to provide for a power outlet that is tamper resistant.

SUMMARY OF THE DISCLOSURE

According to a first aspect of the present disclosure, an electrical power outlet is provided. The electrical power outlet includes a housing, a faceplate having a plurality of slots configured to receive a plurality of prongs on an electrical plug, a plurality of electrical terminals configured to receive the plurality of prongs to provide electrical connections, and a flexible cover disposed between the plurality of slots and the plurality of terminals, the flexible cover having a plurality of slits configured to receive the plurality of prongs in an open position and for covering access to the plurality of terminals in a closed position.

Embodiments of the first aspect of the present disclosure can include any one or a combination of the following features:

- a switch coupled to at least one of the plurality of electrical terminals to detect the connection of a first prong to a first electrical terminal of the plurality of electrical terminals;
- the switch activates electrical power supplied to the plurality of prongs when the switch detects connection of the first prong to the first electrical terminal;
- a circuit board, wherein the plurality of electrical terminals are mounted on the circuit board and the switch is aligned to be engaged with the first electrical terminal;
- the switch is coupled to the circuit board;
- a light source configured to illuminate at least a region proximate the faceplate when the switch detects connection of the first prong to the first electrical terminal;
- the light source comprises a light transmissive optic element forming a ring surrounding the faceplate;
- the light source comprises a light-emitting diode (LED);
- the cover comprises a membrane of flexible material;
- the housing comprises a first bezel configured to connect to a second bezel; and
- the electrical power outlet is located on a motor vehicle.

According to a second aspect of the present disclosure, an electrical power outlet is provided. The electrical power outlet includes a housing, a faceplate having a plurality of slots configured to receive a plurality of prongs on an electrical plug, and a plurality of electrical terminals configured to receive the plurality of prongs to provide electrical connections. The electrical power outlet also includes a flexible cover disposed between the plurality of slots and the plurality of terminals, the flexible cover having a plurality of slits configured to receive the plurality of prongs in an open position and for covering access to the plurality of terminals in a closed position, and a switch coupled to a first electrical terminal of the plurality of electrical terminals to detect the connection of a first prong to the first electrical terminals, wherein the switch activates electrical power supplied to the plurality of prongs when the switch detects connection of the first prong to the first electrical terminal. The electrical power outlet further includes a circuit board, wherein the plurality of electrical terminals are mounted on the circuit board and the switch is aligned to be engaged with the first electrical terminal, wherein the switch is coupled to the circuit board, and a light source configured to illuminate a region proximate the faceplate when the switch detects connection of the first prong to the first electrical terminal.

According to a third aspect of the present disclosure, a vehicle is provided including an electrical power source, power lines receiving electrical power from the electrical power source, and an electrical power outlet coupled to the power lines. The electrical power outlet including a housing, a faceplate having a plurality of slots configured to receive a plurality of prongs on an electrical plug, a plurality of electrical terminals configured to receive the plurality of prongs to provide electrical connections, and a flexible cover disposed between the plurality of slots and the plurality of terminals, the flexible cover having a plurality of slits configured to receive the plurality of prongs in an open position and for covering access to the plurality of terminals in a closed position.

Embodiments of the third aspect of the present disclosure can include any one or a combination of the following features:

- a switch coupled to a first electrical terminal of the plurality of terminals to detect the connection of a prong in the first electrical terminal, wherein the switch activates electrical power supplied to the plurality of prongs when the switch detects connection of the first prong to the first electrical terminal;
- a circuit board, wherein the plurality of electrical terminals and the switch are mounted on the circuit board and the switch is aligned to be engaged with the at the first electrical terminal on the circuit board;
- a light source configured to illuminate at least a region proximate the faceplate when the switch detects connection of the first prong to the first electrical terminal or change color according to a status of the plug;
- the light source comprises a light transmissive optic element forming a ring surrounding the faceplate;
- the light source comprises a light-emitting diode (LED);
- the cover comprises a membrane of flexible material; and
- the plurality of slits includes I-shaped slits.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
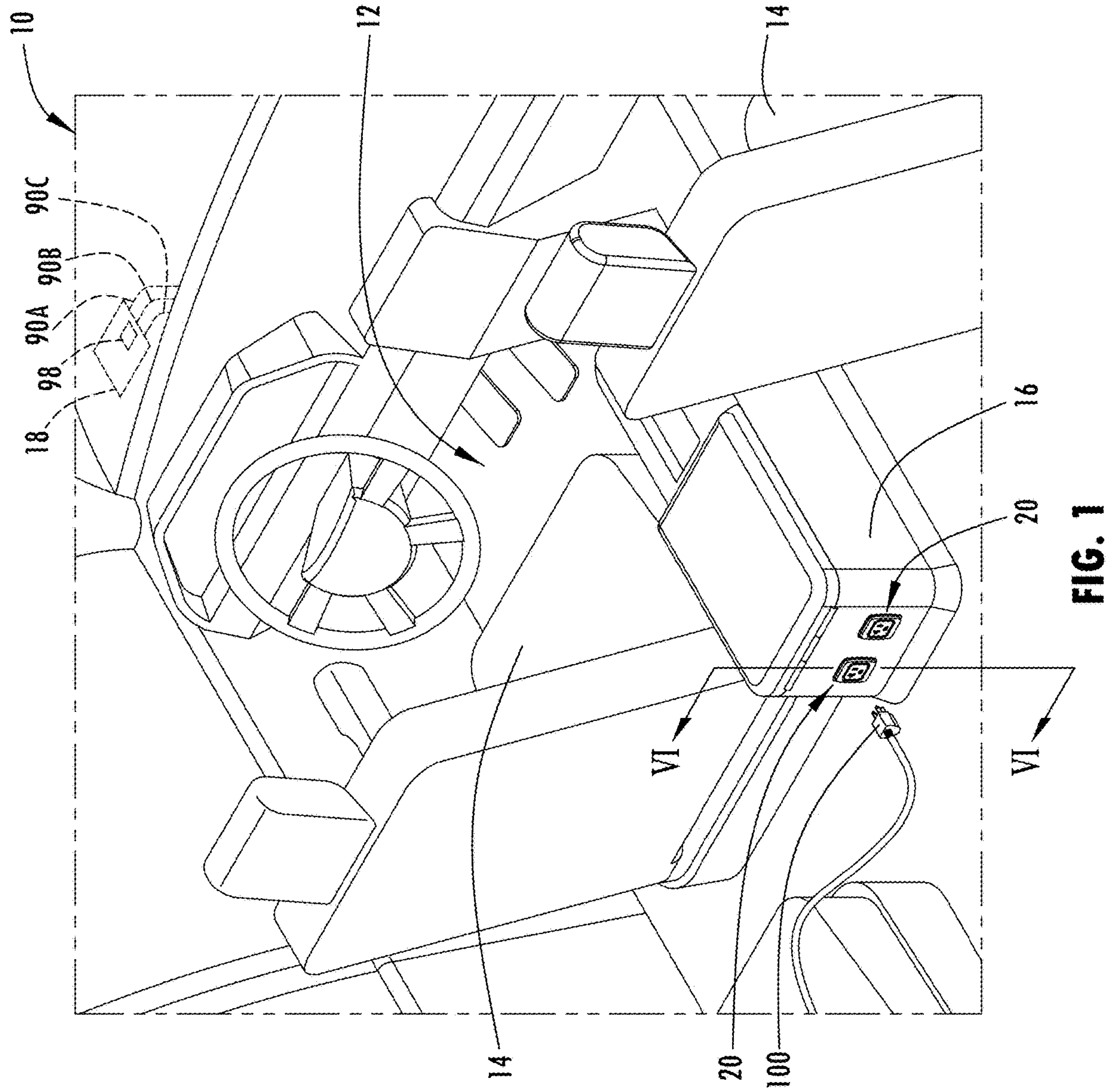
FIG. 1 is a perspective view of a front portion of an interior of a motor vehicle having an electrical power outlet, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an electrical power outlet and a vehicle having an electrical power outlet. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10 is generally illustrated configured with passenger seating for transporting one or more passengers including a driver of the vehicle 10 and one or more passengers, according to one example. The motor vehicle 10 has a vehicle body that generally defines a cabin interior 12. The cabin interior 12 may include various features and trim components. The cabin interior 12 is generally shown having an arrangement of passenger seats including a front row of seating having a pair of seats 14 generally spaced apart from one another, according to one example. Located but not restricted in the space between the pair of seats 14 in the front row is a center console 16, which may provide storage and an armrest for the driver and passenger seated in seats 14.

It should be appreciated that the motor vehicle 10 may be a wheeled motor vehicle, such as a car, truck, SUV, bus, van or other vehicle. According to other examples, the motor vehicle 10 may be an aircraft, a boat, or other motor vehicle. The motor vehicle 10 may have a motor, such as an internal combustion engine or an electrical motor or both, according to a few examples. The motor vehicle 10 has an electrical power source 18, which is shown as a battery. It should be appreciated that one or more batteries supplying electrical power may be provided on the motor vehicle 10. The electrical power may be in the form of a direct current (DC) voltage such as a 12-volt battery. It should also be appreciated that the motor vehicle 10 may include inverter circuitry 98 for converting the DC voltage to an alternating current (AC) voltage and power lines 90A-90C for supplying the AC electrical power output to one or more electrical power outlets.

The motor vehicle 10 is shown equipped with one or more electrical power outlets 20 for supplying the AC electrical power to one or more plug-in devices. In the embodiment shown, a pair of electrical power outlets 20 are shown located on the rear facing wall of the rear end of the center console 16 and are made available for passengers generally seated rearward of the front row of seating to plug-in an electrical plug 100 associated with one or more electrically-powered devices such as a phone, a computer, a speaker or any electrically-powered devices. It should further be appreciated that one or more electrical power outlets 20 may be located elsewhere on the motor vehicle 10 such as forward of the center console, within the center console 16 or within other areas that are accessible to one or more passengers in the motor vehicle 10 to supply power to one or more electrical powered devices. It should further be appreciated that the electrical power outlet 20 as shown and described herein may be used on a motor vehicle or off a vehicle, such as within a home environment, according to other embodiments.

Figure 2:
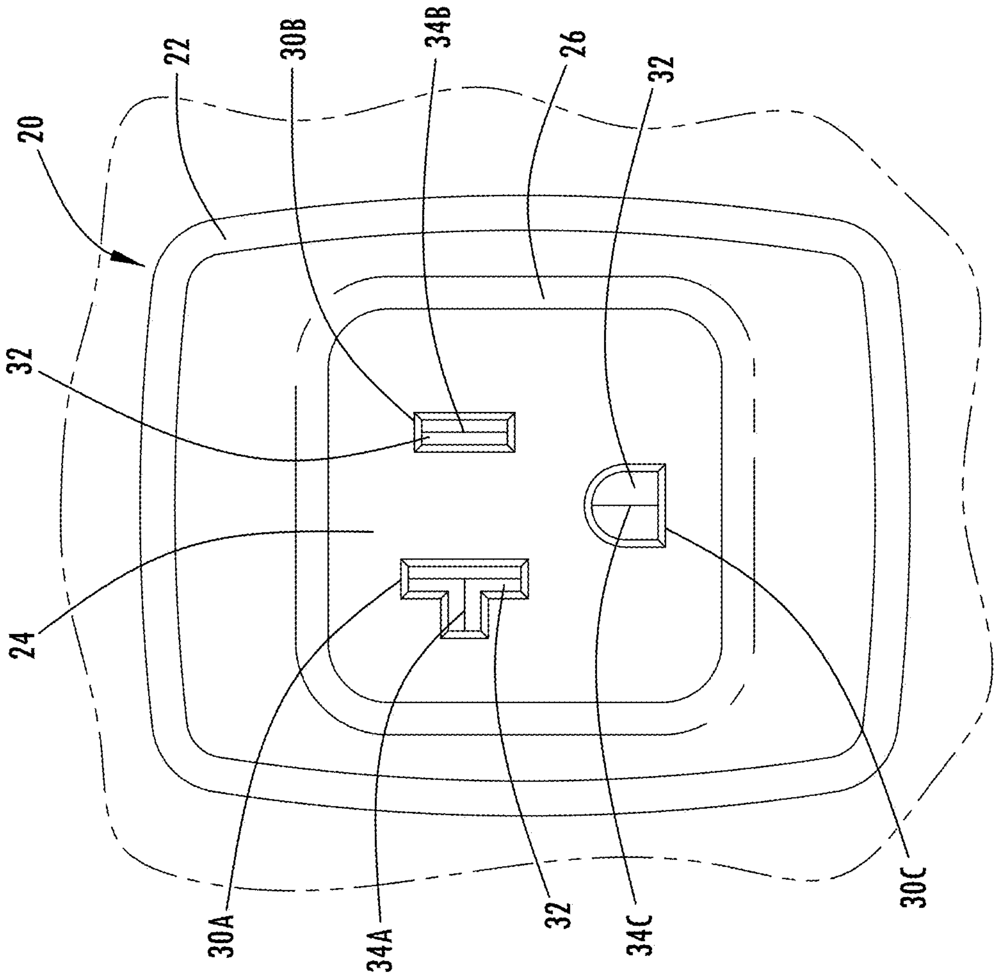
FIG. 2 is an enlarged front view of the electrical power outlet illustrated in FIG. 1, according to one embodiment.

The electrical power outlet 20 is illustrated in FIGS. 2-6A configured as a three-prong receptacle, according to a first embodiment. As seen in FIG. 2, the electrical power outlet 20 has a housing 22 which is generally mounted in an opening formed in a wall of the center console 16. The housing 22 has a faceplate 24 on the front end thereof which generally defines a region having a plurality of receptacle outlet slots configured in a shape, size and arrangement to receive a plurality of prongs, such as two or three prongs, on an electrical plug 100. In the embodiment shown, the faceplate 24 has three receptacle outlet slots 30A-30C. The first and second receptacle outlet slots 30A and 30B generally include an elongated portion for receiving aligned positive and negative prongs of the electrical plug 100 which, in turn, connect to positive and negative terminals for receiving positive and negative AC electrical power, according to one example. The positive AC electrical power may be referred to as the hot signal and the negative AC electrical power may be referred to as the neutral signal. The third receptacle outlet slot 30C is located below the first and second slots 30A and 30C and is configured to matingly engage a ground prong on the electrical plug 100 to provide a ground electrical connection. It should be appreciated that some electrical plugs may include a ground prong and other electrical plugs may not include a ground prong. The arrangement of the three slots 30A-30C shown is consistent with a North American style electrical plug, according to one example. However, it should be appreciated that the slots 30A-30C may otherwise be configured according to other arrangements, such as a European style or an Asian Pacific style electrical outlet, for example.

Disposed proximate to the faceplate 24 and configured around a periphery of the faceplate 24 is a light ring area 26 which is generally formed by an open region that receives and illuminates light from a light source 48 emitted into a receiver 54 on the back side of the faceplate 24. The light ring area 26 may be illuminated when the electrical prongs on an electrical plug extend into the receptacle outlet slots 30A-30C and make an electrical connection with electrical terminals inside of the electrical power outlet 20. As such, the light ring area 26 provides a light ring which serves as an indication that a plug-in device has been connected to the electrical power outlet and is energized to supply electrical power from the power source.

Figure 3:
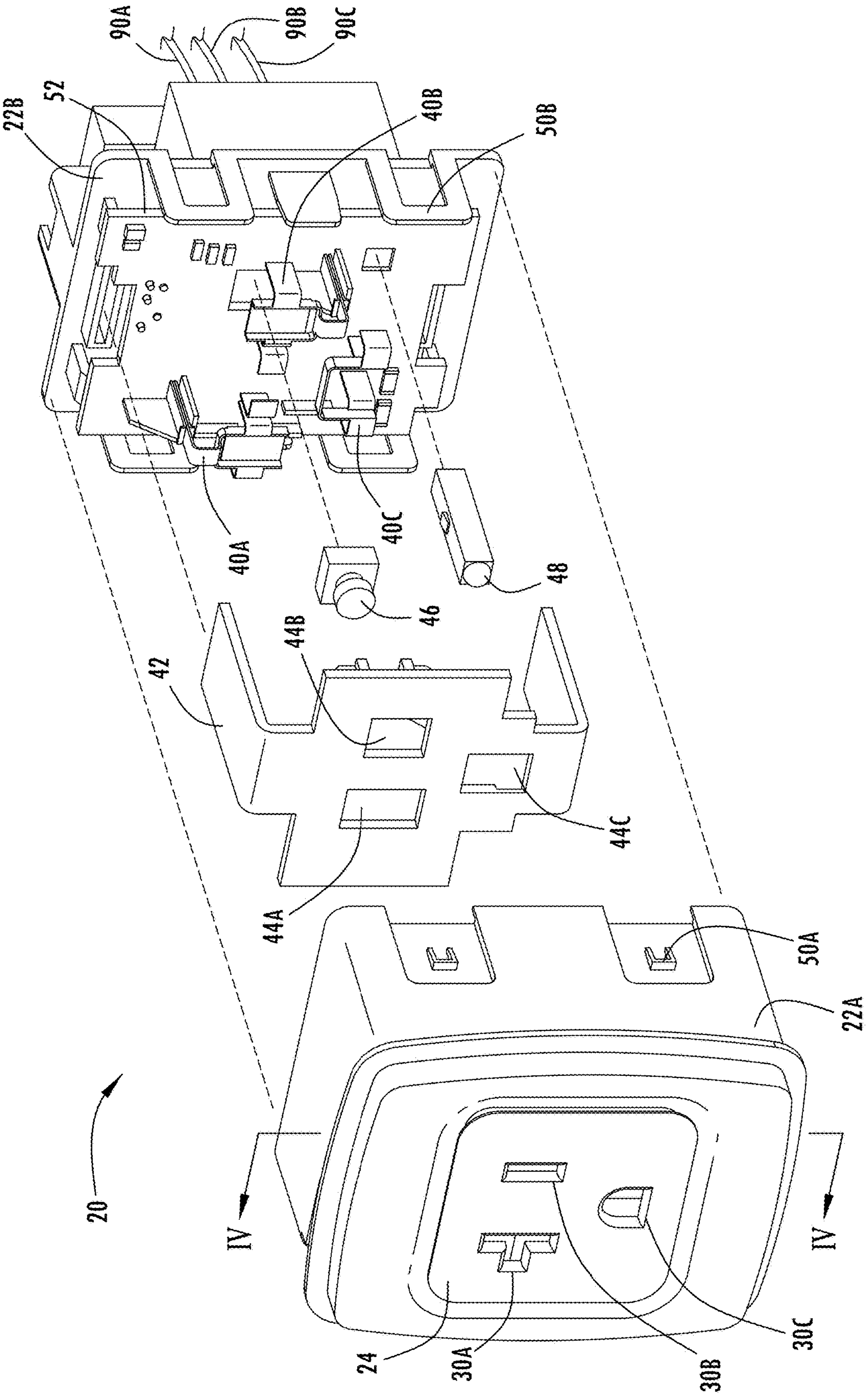
FIG. 3 is an exploded front perspective view of the electrical power outlet illustrated in FIG. 2.

The electrical power outlet 20 further includes a plurality of electrical terminals 40A-40C which are further illustrated in FIG. 3 which are aligned and arranged in the same configuration to the receptacle outlet slots 30A-30C. The electrical terminals 40A-40C are shown mounted on a printed circuit board 52. The circuit board 52 is generally supported within a rear internal housing bezel 22B which connects to a front external housing bezel 22A to form the housing 22. Each of the electrical terminals 40A-40C is formed having an electrically conductive contacts shaped to receive a corresponding prong from an electrical plug 100. Disposed between the electrical terminals 40A-40C and the receptacle outlet slots 30A-30C is a support base 42 which generally includes openings 44A-44C. Openings 44A-44C are shaped, sized and aligned with the corresponding slots 30A-30C and corresponding terminals 40A-40C to allow the prongs on the electrical plug to extend through slots 30A-30C, and through openings 44A-44C and into contact with electrical terminals 40A-40C. As such, the support base 42 helps to support the prongs as they extend into and make contact with electrical terminals 40A-40C.

Also provided on the printed circuit board 52 is a lighting device 48 shown as a light-emitting diode (LED). The lighting device 48 generally extend forward proximate to the faceplate 24 and when activated emits light within the light ring area 26. As such, an illuminated light ring is provided around the periphery of the faceplate 24. In addition, a mechanical switch 46 is disposed on the printed circuit board 52 and is aligned with one of the electrical terminals 40A-40C. As such, the switch 46 is aligned to receive and make physical contact with a first prong of the electrical plug when the electrical plug is fully plugged into the electrical power outlet 20. In the example shown, a first prong 102B of the electrical plug 100 may extend through slot 30B, opening 44B and make contact with a first electrical terminal 40B. In doing so, the first prong 102B will forcibly engage the switch 46 and mechanically depress the switch 46 to change state as an indication that an electrical plug is connected to the electrical power outlet 20. With the switch 46 is engaged by a prong, electrical power is supplied to the electrical terminals 40A-40C to supply power to an electrically-powered device via the electrical plug 100. In addition, the lighting device 48 is illuminated to illuminate the light ring area 26 to indicate that the electrical power outlet 20 is powered or providing status of the plug depending on the configuration given.

The housing 22 includes both the external front bezel 22A which connects with the rear internal bezel 22B. To make the connection, a plurality of flexible fingers 50B provided on the rear internal bezel 22B are configured to engage tabs 50A on the front exterior bezel 22A to connect and hold the housing assembled together and to contain the parts therein.

Figure 4:
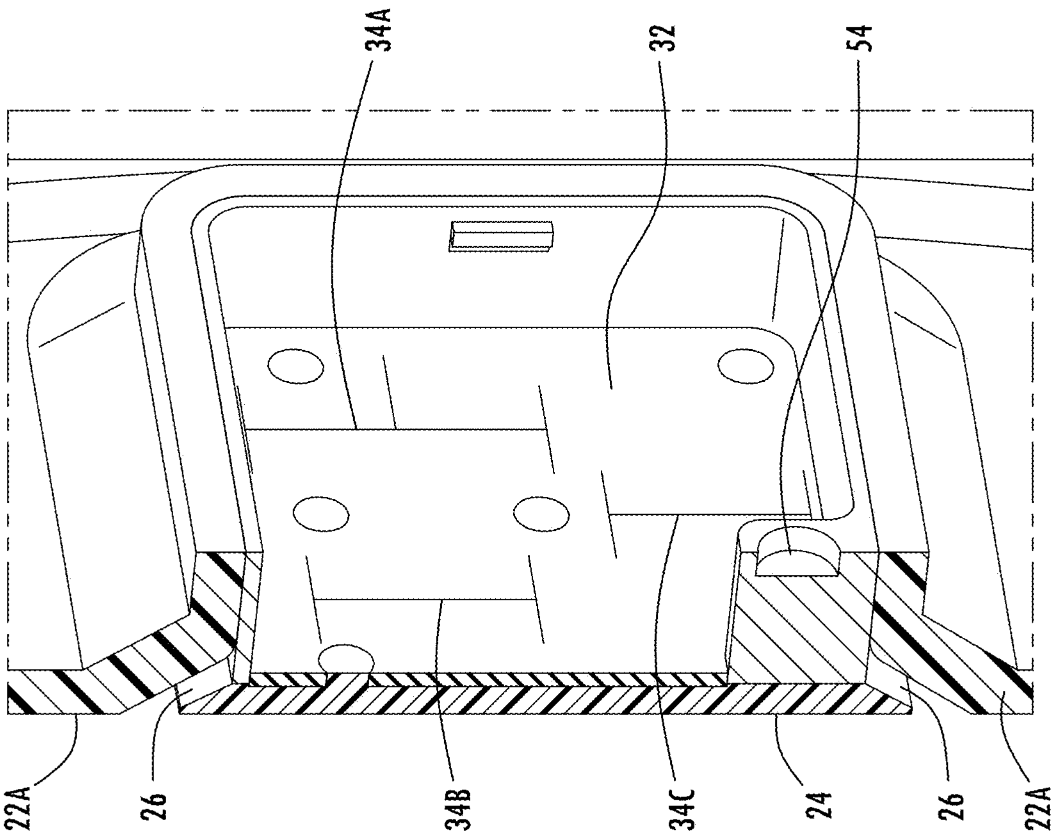
FIG. 4 is a cross-sectional view taken through line IV-IV of FIG. 3.
Figure 5:
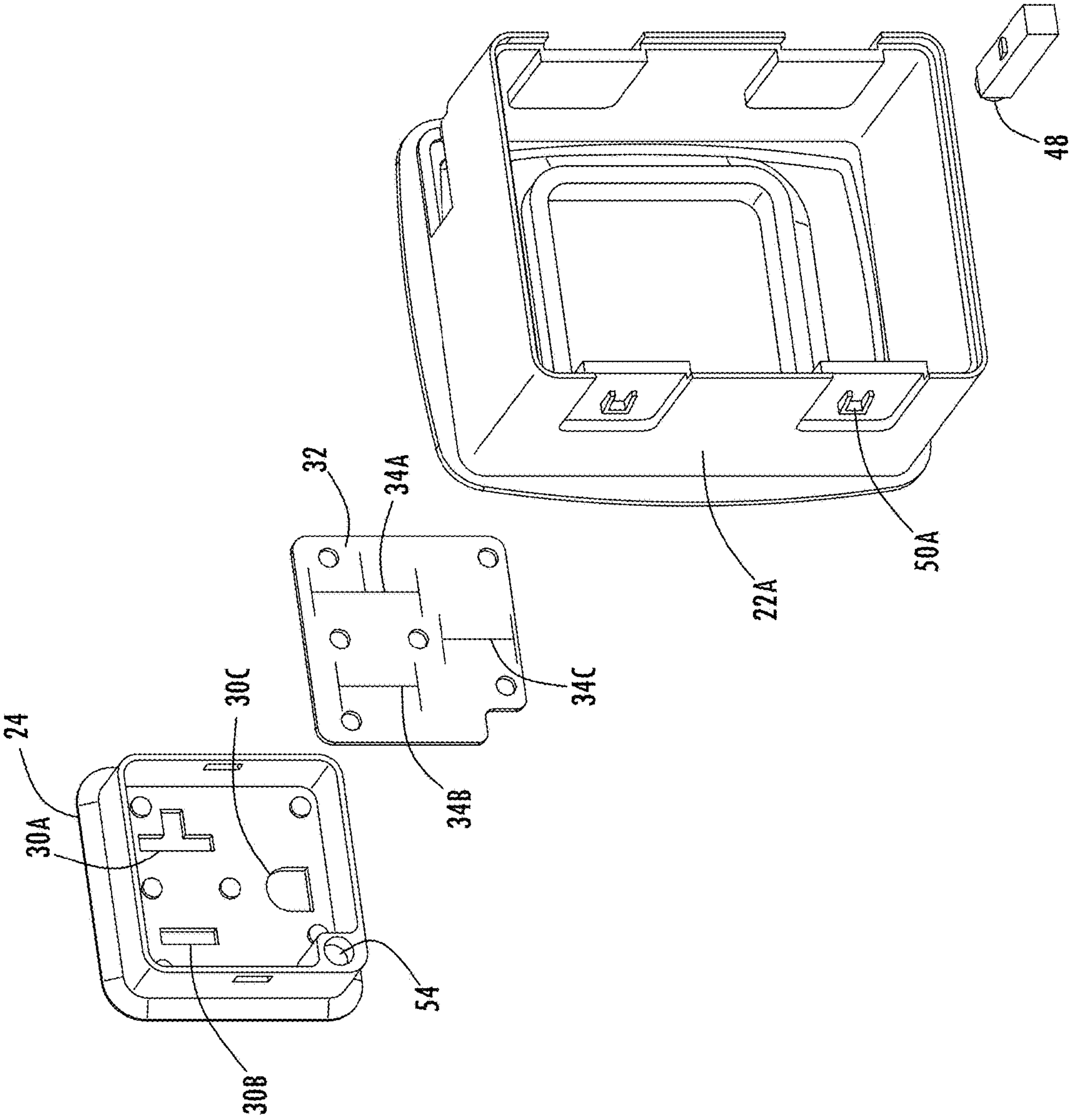
FIG. 5 is an exploded rear perspective view of a portion of the electrical power outlet.

With particular reference to FIGS. 4 and 5, the electrical power outlet 20 is shown having a flexible cover 32 disposed between the plurality of receptacle outlet slots 30A-30C and the plurality of electrical terminals 40A-40C. In the example shown, the flexible cover 32 is located immediately behind the receptacle outlet slots 30A-30C formed in the faceplate 24 and forward of the support base 42. The flexible cover 32 is a flexible thin membrane that includes a plurality of slits 34A-34C formed in the regions immediately proximate the corresponding receptacle outlet slots 30A-30C. Each of the slits 34A-34C allows the thin membrane to flex and separate to an open position as a prong of the electrical plug is forcibly inserted through the corresponding receptacle outlet slots 30A-30C and against the flexible cover 32. When this occurs, the slits 34A-34C open to allow the corresponding prongs to extend therethrough and to make contact with the corresponding electrical terminals 40A-40C. When the prongs of the electrical plug are removed from the electrical power outlet 20, the edges of the slits 34A-34C of the flexible cover 32 return with memory to the closed position. This allows for the blockage of particles such as dirt and water or any unwanted objects from tampering with or otherwise entering the electrical power outlet 20.

The flexible cover 32 may be made of a thin flexible material which may include a polymeric material such as plastic or rubber, for example, and has a sufficiently thin thickness to allow the membrane to flex between open and closed positions during insertion or removal of the plug. In the example shown, the slits 34A-34C generally include an I-shape slit with an elongated vertical slit extending between upper and lower horizontal sits are seen in FIG. 5. Slit 34A further includes an extra horizontal slit extending midway between the upper and lower slits. However, it should be appreciated that other shapes and sizes of slits 34A-34C may be provided in the flexible cover 32.

Figure 6A:
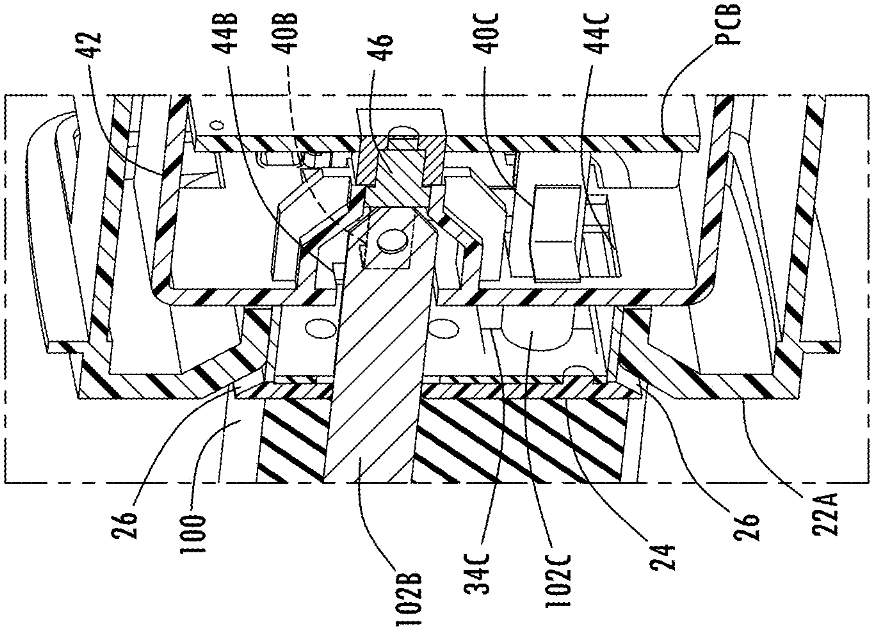
FIG. 6A is a cross-sectional view taken through line VI-VI of FIG. 1 illustrating an electrical plug of for an electronic powered device inserted in the electrical power outlet.
Figure 6:
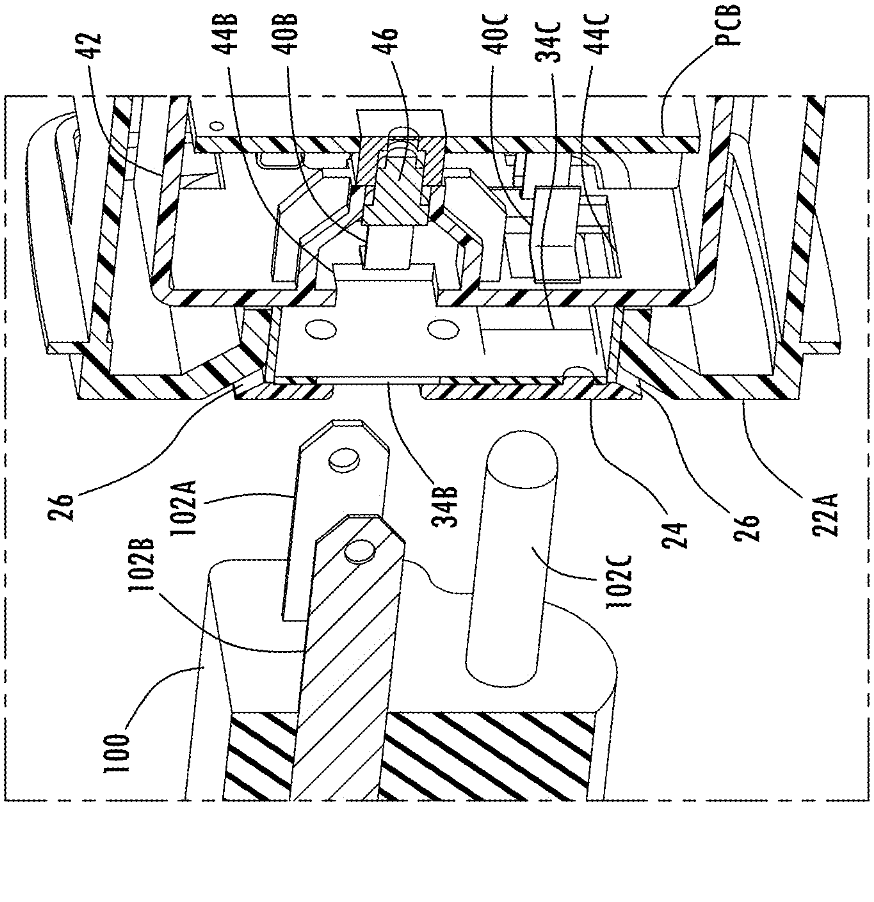
FIG. 6 is a cross-sectional perspective view of the electrical power outlet taken through line VI-VI of FIG. 1 with an electrical plug of a device disconnected therefrom.
Figure 7:
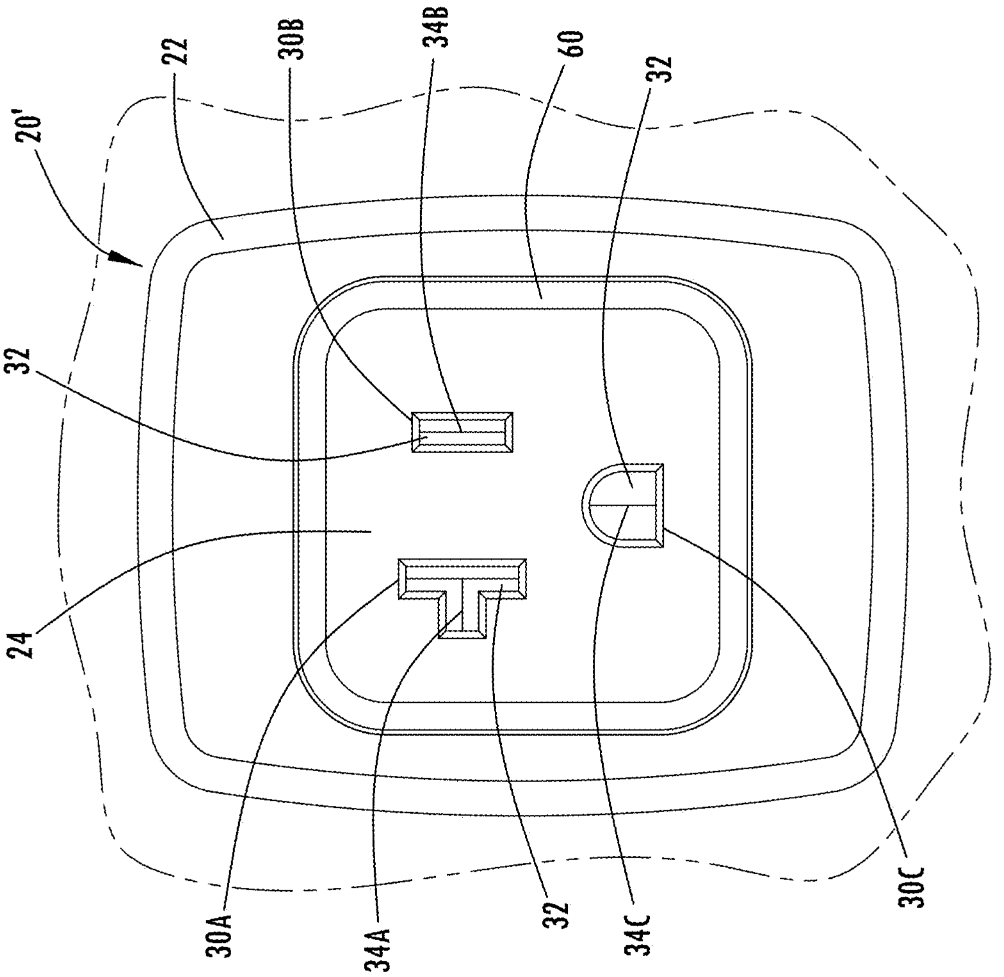
FIG. 7 is a front perspective view of an electrical power outlet having a light output ring, according to another embodiment.
Figure 8:
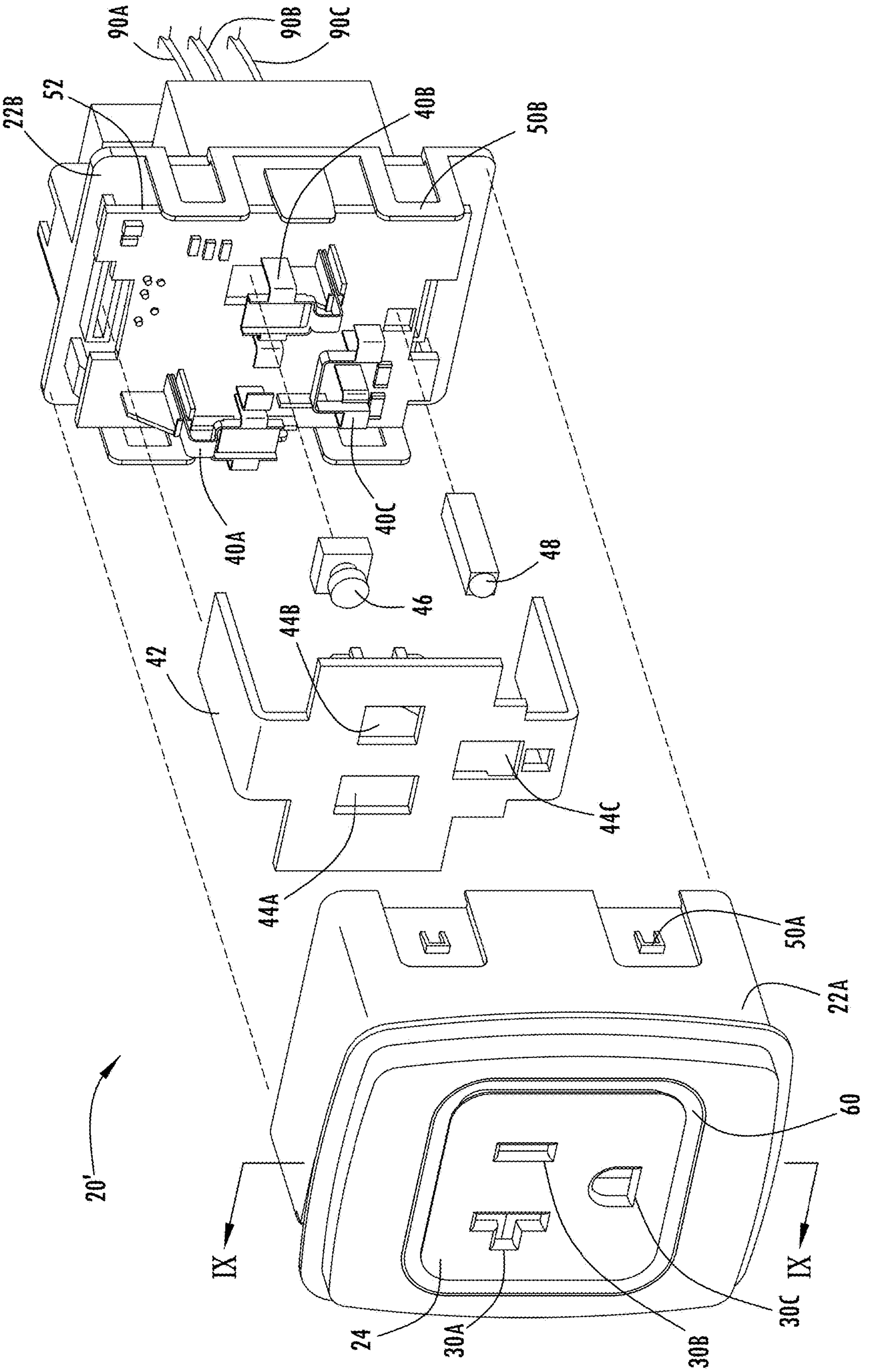
FIG. 8 is an exploded front perspective view of the electrical power outlet illustrated in FIG. 7.
Figure 9:
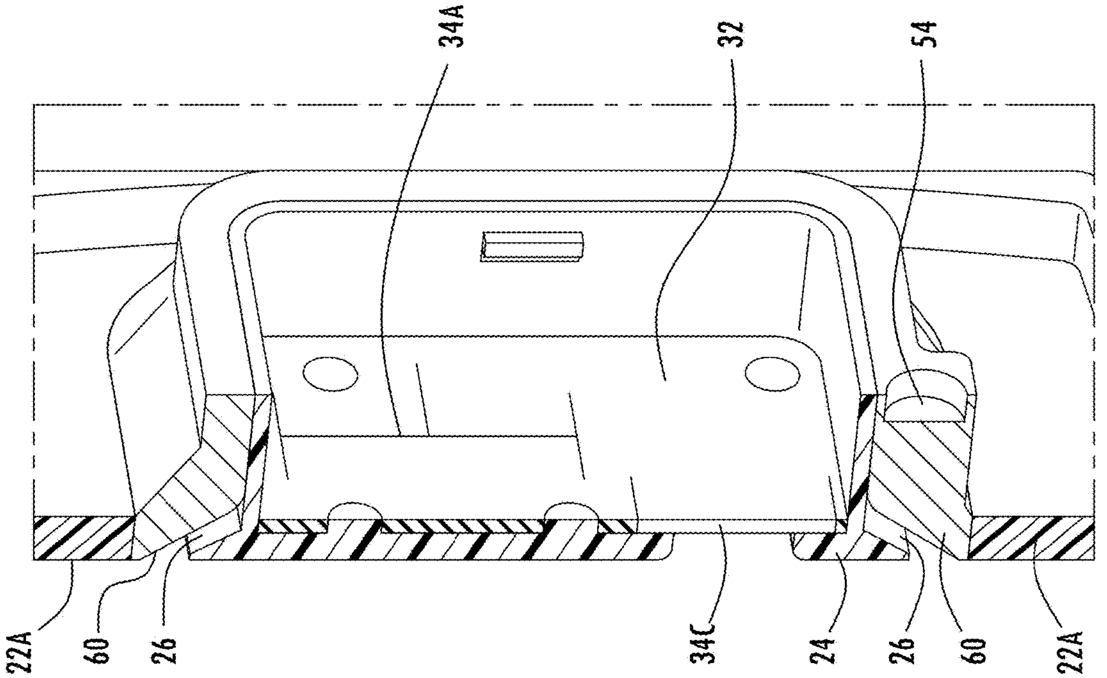
FIG. 9 is a cross-sectional view taken through line IX-IX of FIG. 8.
Figure 10:
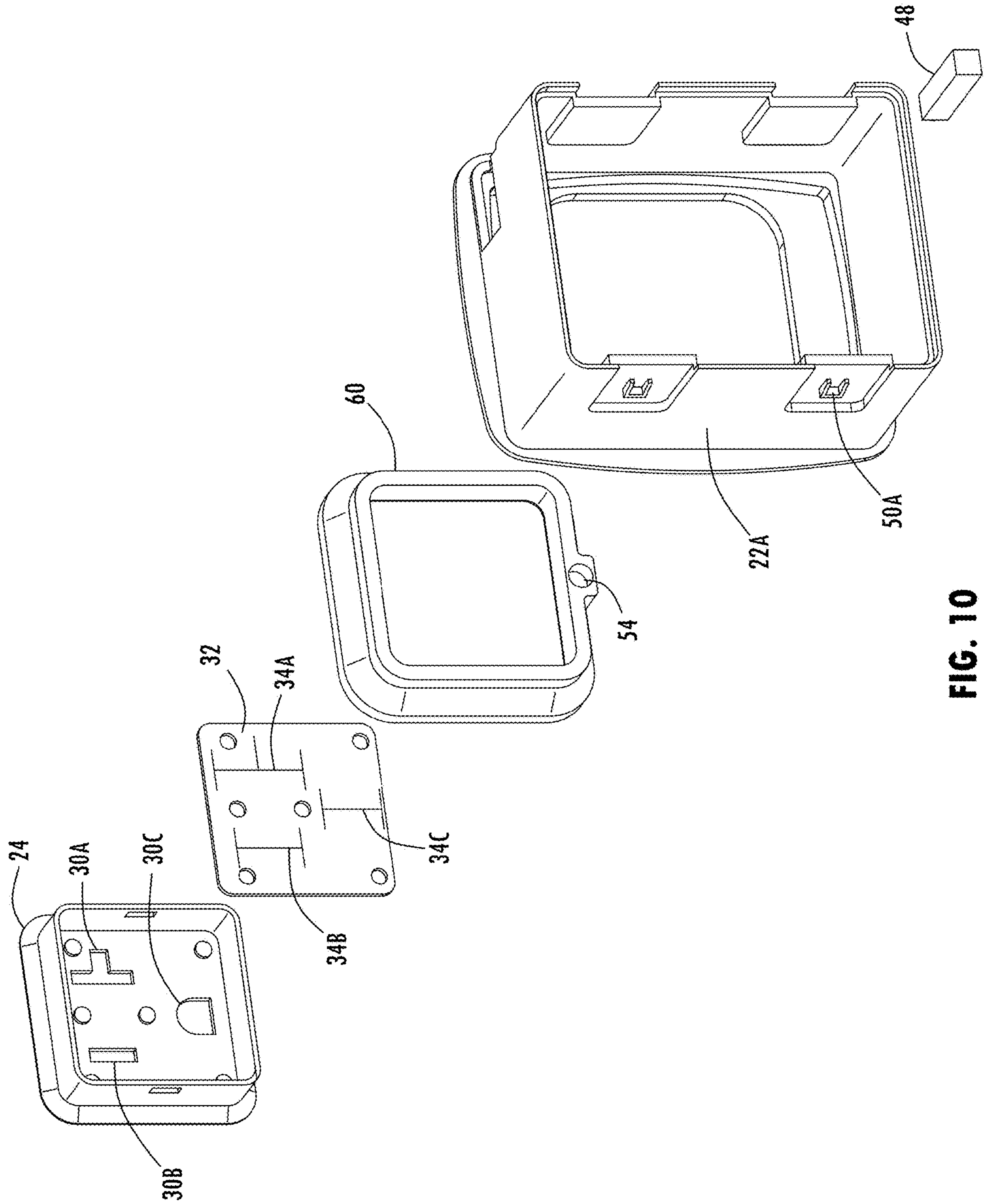
FIG. 10 is a rear exploded view of a portion of the electrical power outlet shown in FIG. 7.

With reference to FIGS. 6 and 6A, one example of an electrical plug 100 positioned to engage the electrical power outlet 20 is shown in FIG. 6. As seen in FIG. 6A, the electrical plug 100 is fully inserted into the electrical outlet 20 such that the prongs 102A-102C contact the corresponding terminals 40A-40C. In doing so, first prong 102B makes contact with switch 46 and depresses the switch 46 so as to change the state of the switch 46 to activate electric power to the light source 48 and to activate electric power supplied to the electrical plug 100 to power an external electrically-powered device connected thereto.

Referring to FIGS. 7-10, an electrical power outlet 20' is illustrated, according to a second embodiment. The electrical power outlet 20' may likewise be located on a motor vehicle. In this embodiment, the electrical power outlet 20' includes a similar arrangement of a faceplate 24 having receptacle outlet slots 30A-30C arranged to receive an electrical plug to power an electric powered device. Electrical terminals 40A-40C are mounted on a printed circuit board 52 and a switch is aligned with the first electrical terminal 40B. Located between the faceplate 24 and the plurality of electrical terminals 40A-40C is the flexible cover 32 which includes the slits 34A-34C.

In this embodiment, a light transparent optical ring 60 is disposed proximate the light ring area 26 to provide a luminescent illumination in the light ring area 26 extending around the faceplate 24. The light source 48 is aligned to backlight the light transparent optical ring 60. The optical ring 60 may include an optically transparent material such as diffuse light pipe that illuminates a ring of light when illuminated by a light source 48 onto a receiver 54 on the back side of the optical ring 60. The optical material may include glass having diffuse light properties.

Figures 11, 12:
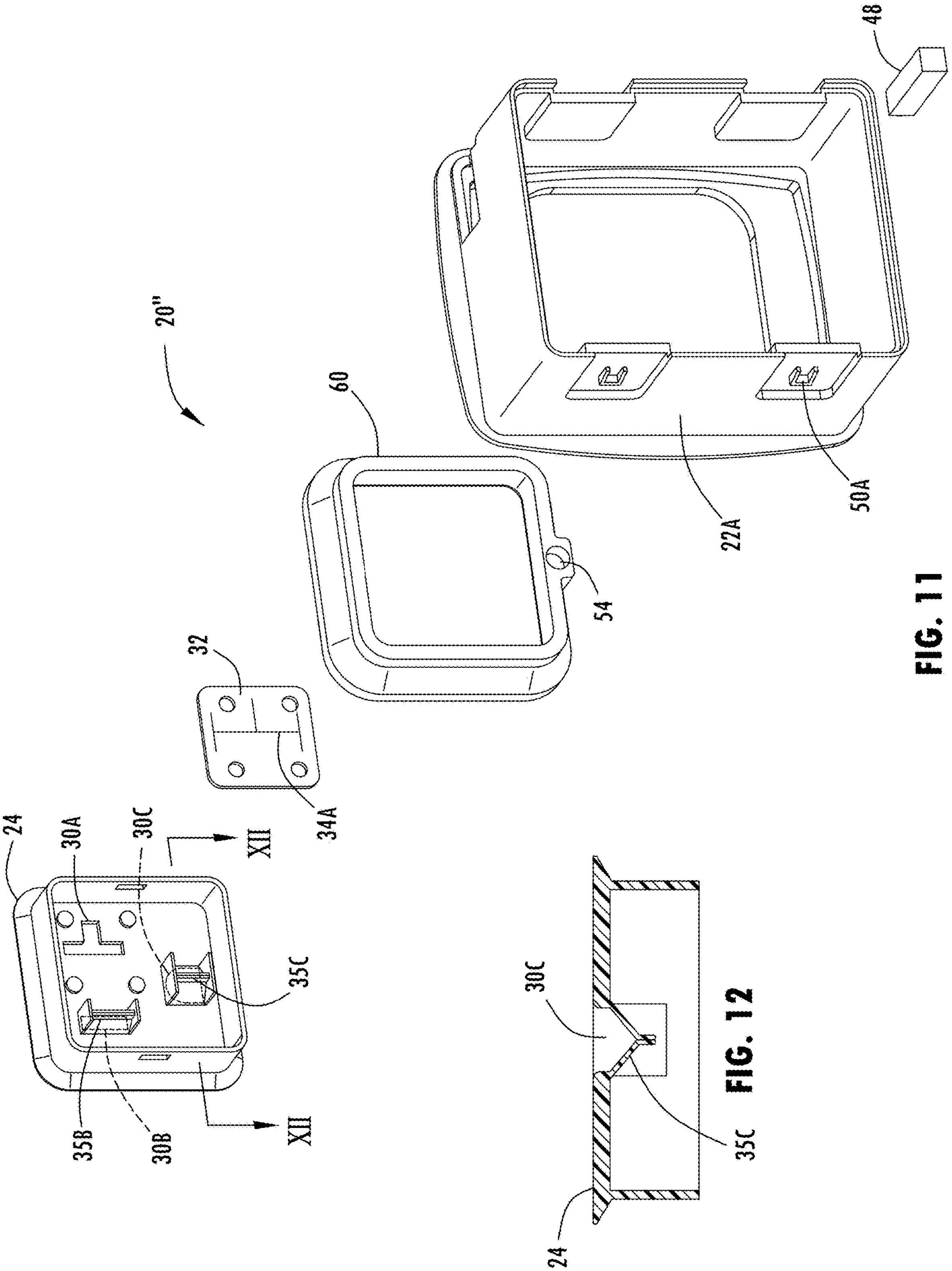
FIG. 11 is an exploded rear perspective view of the electrical power outlet further having clips positioned proximate to slots, according to a further embodiment.
FIG. 12 is a cross-sectional view taken through line XII-XII of FIG. 11.

Referring to FIGS. 11 and 12, an electrical power outlet 20" is illustrated according to a further embodiment. In this embodiment, the electrical power outlet 20" includes a similar arrangement of components except the flexible cover 32 is disposed behind slot 30A and internal tabs 35B and 35C are positioned behind slots 30B and 30C. The tabs 35B and 35C are made up of two flexible arms that normally abut and are biased towards each other in a closed position and flex to an open position when a prong is forcibly extended therethrough. As such, tabs 35B and 35C may operate as a flexible cover.

Accordingly, the electrical power outlet 20 advantageously provides for a flexible cover 32 disposed between the plurality of receptacle outlet slots and the plurality of terminals and arranged with a plurality of slits configured to receive the plurality of prongs of the electrical plug for covering the plurality of terminals to prevent contaminants from entering the electrical power outlet 20 and tampering of the electrical power outlet 20.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An electrical power outlet comprising:
- a housing;
- a faceplate having a plurality of slots configured to receive a plurality of prongs on an electrical plug;
- a plurality of electrical terminals configured to receive the plurality of prongs to provide electrical connections;
- a flexible cover disposed between the plurality of slots and the plurality of terminals, the flexible cover having a plurality of slits configured to receive the plurality of prongs in an open position and for covering access to the plurality of terminals in a closed position;
- a switch coupled to at least one of the plurality of electrical terminals to detect the connection of a first prong to a first electrical terminal of the plurality of electrical terminals, wherein the switch activates electrical power supplied to the plurality of prongs when the switch detects connection of the first prong to the first electrical terminal; and
- a circuit board, wherein the plurality of electrical terminals are mounted on the circuit board and the switch is aligned to be engaged with the first electrical terminal.

2. The electrical power outlet of claim 1, wherein the switch is coupled to the circuit board.

3. The electrical power outlet of claim 1, wherein the cover comprises a membrane of flexible material.

4. The electrical power outlet of claim 1, wherein the housing comprises a first bezel configured to connect to a second bezel.

5. The electrical power outlet of claim 1, wherein the electrical power outlet is located on a motor vehicle.

6. The electrical power outlet of claim 1 further comprising a light source configured to illuminate at least a region proximate the faceplate when the switch detects connection of the first prong to the first electrical terminal.

7. The electrical power outlet of claim 6, wherein the light source comprises a light transmissive optic element forming a ring surrounding the faceplate.

8. The electrical power outlet of claim 6, wherein the light source comprises a light-emitting diode (LED).

9. An electrical power outlet comprising:

a housing;

a faceplate having a plurality of slots configured to receive a plurality of prongs on an electrical plug;

a plurality of electrical terminals configured to receive the plurality of prongs to provide electrical connections;

a flexible cover disposed between the plurality of slots and the plurality of terminals, the flexible cover having a plurality of slits configured to receive the plurality of prongs in an open position and for covering access to the plurality of terminals in a closed position;

a switch coupled to a first electrical terminal of the plurality of electrical terminals to detect the connection of a first prong to the first electrical terminals, wherein the switch activates electrical power supplied to the plurality of prongs when the switch detects connection of the first prong to the first electrical terminal;

a circuit board, wherein the plurality of electrical terminals are mounted on the circuit board and the switch is aligned to be engaged with the first electrical terminal, wherein the switch is coupled to the circuit board; and a light source configured to illuminate a region proximate the faceplate when the switch detects connection of the first prong to the first electrical terminal.

10. The vehicle of claim 9, wherein the cover comprises a membrane of flexible material.

11. The vehicle of claim 9, wherein the plurality of slits includes I-shaped slits.

12. A vehicle comprising:

an electrical power source;

power lines receiving electrical power from the electrical power source; and an electrical power outlet coupled to the power lines, the electrical power outlet comprising:

a housing;

a faceplate having a plurality of slots configured to receive a plurality of prongs on an electrical plug;

a plurality of electrical terminals configured to receive the plurality of prongs to provide electrical connections;

a flexible cover disposed between the plurality of slots and the plurality of terminals, the flexible cover having a plurality of slits configured to receive the plurality of prongs in an open position and for covering access to the plurality of terminals in a closed position;

a switch coupled to a first electrical terminal of the plurality of terminals to detect the connection of a prong in the first electrical terminal, wherein the switch activates electrical power supplied to the plurality of prongs when the switch detects connection of the first prong to the first electrical terminal; and a circuit board, wherein the plurality of electrical terminals and the switch are mounted on the circuit board and the switch is aligned to be engaged with the at the first electrical terminal on the circuit board.

13. The vehicle of claim 12 further comprising a light source configured to illuminate at least a region proximate the faceplate when the switch detects connection of the first prong to the first electrical terminal or change color according to a status of the plug.

14. The vehicle of claim 13, wherein the light source comprises a light transmissive optic element forming a ring surrounding the faceplate.

15. The vehicle of claim 13, wherein the light source comprises a light-emitting diode (LED).

* * * * *